United States Patent [19]
Reynolds

[11] 3,975,788
[45] Aug. 24, 1976

[54] METHOD OF FORMING A THREADED FEMALE FASTENER

[75] Inventor: Richard L. Reynolds, Palos Verdes, Calif.

[73] Assignee: Litton Fastening Systems, Lakewood, Calif.

[22] Filed: Nov. 15, 1974

[21] Appl. No.: 524,163

[52] U.S. Cl. .............................. 10/86 A; 10/152 R; 151/14 R
[51] Int. Cl.² ...................... B21D 53/24; B23G 7/00
[58] Field of Search............ 10/86 A, 155 R, 155 A, 10/86 R, 152 T, 152 R; 85/46, 48; 151/22, 14 R

[56] References Cited
UNITED STATES PATENTS

| | | | |
|---|---|---|---|
| 1,488,521 | 4/1924 | Woodward | 10/86 A |
| 1,702,878 | 2/1929 | Mersfelder et al | 151/22 |
| 1,860,522 | 5/1932 | Arnold | 85/46 |
| 1,924,847 | 8/1933 | Edwards | 85/46 |
| 2,052,011 | 8/1936 | Baker | 151/14 R |
| 2,512,082 | 6/1950 | Bainbridge et al | 85/46 |

FOREIGN PATENTS OR APPLICATIONS

| | | | |
|---|---|---|---|
| 701,556 | 1/1965 | Canada | 151/22 |
| 204,236 | 7/1959 | Germany | 85/46 |

*Primary Examiner*—Lowell A. Larson
*Assistant Examiner*—E. M. Combs
*Attorney, Agent, or Firm*—Alan C. Rose; Thomas A. Turner; Donald J. Ellingsberg

[57] ABSTRACT

The invention described herein relates to a method of making a threaded nut fastener which joins with a threaded male or screw fastener wherein the threads of the nut are partially formed so as to provide for up to 80% thread-to-thread engagement of the screw threads with the nut threads.

3 Claims, 3 Drawing Figures

METHOD OF FORMING A THREADED FEMALE FASTENER

BACKGROUND OF THE DISCLOSURE

Threaded fasteners have long provided a convenient, efficient and secure method of fastening parts together. Typically, a male threaded fastener, consisting of an elongated cylindrical shank having helical threads formed thereabout, is driven through a nut or hole commonly having threads formed therein. The nut typically has a flange extending from the interiorly-threaded hole. This nut flange cooperates with a flange or head on the end of the male threaded fastener's shank, so as to hold together material through which the male threaded fastener is inserted. Such fastening arrangements have been so long known in the art that their origin is probably unascertainable. Nonetheless, new problems are constantly being faced by the threaded fastener industry, and adaptations of the basic threaded elemental design are being discovered to solve the unique problems which seemingly endlessly present themselves to the industry.

Characteristically, whenever a male threaded fastener, or screw is inserted into a threaded, female threaded fastener, or nut, the surfacial contact between the helical screw thread and the helical nut thread is not normally 100%. Hereafter, in this description, the term "screw" will be used interchangeably with, and will be used to mean the same as the male threaded fastener having helical threads formed thereabout. Hereafter also, the term "nut" shall be used to describe the female threaded fastener. The term "nut" could be used interchangeably with the term female threaded fastener. The term "nut", also, shall be used hereafter to define any hole through which the screw may be inserted and secured thereto to form a fastening.

Examples of past improvements and variations of the basic threaded fastener screw and nut design can be seen in U.S. Pat. No. 271,852 to Hull and U.S. Pat. No. 597,000 to Higbee. In Higbee, it can be particularly appreciated, partially formed threads on the screw or male fitted fastener member are reformed when inserted or forcefully driven into a perfectly formed threaded nut or hole. Such teachings, however, do not appreciate the particular problems encountered by current industrial techniques, inasmuch as it is the forming of threads within an internal hole or nut which present unique production problems and opportunities for savings and efficiency.

The term "thread-to-thread engagement" hereafter will be used to denominate or to define the ratio of (1) the surface area of the helical screw threads which actually contact the surface area of the helical nut threads, when compared with (2) the total surface area of the helical screw threads within the hole of the nut. The imperfect, less than 100% surfacial mating of the screw threads with the nut threads, or thread-to-thread engagement can be caused by the fact that the helical pitch of the screw could be slightly varied from the helical pitch of the threads in the nut. Moreover, the pitch angle of the screw could vary slightly from the pitch angle of the nut. Also, mere imperfections or deviations in the molding, casting or rolling of the threads of the screw could make its threads vary from the formed threads of the nut. Thus, on one, two or several of the helical threads of the screw, an air pocket hole, lump or manufacturing crease or tail might be found. Moreover, the screw thread might have some of its turns flattened or otherwise deformed. Additionally, temperature may change the precise cross-sectional configuration of the screw's threads. Likewise on the nut thread, temperature, handling and manufacturing factors may cause one, two or more of the helical nut threads to be deformed, or to otherwise vary from the desired or designed thread form. Thus, when a screw is inserted into a nut, it is uncommon to have greater than 55% thread-to-thread engagement.

It has been found that thread-to-thread engagement exceeding 60% does not improve the shearing strength of the threads, but does improve the rotational friction resistance between the nut and the bolt. Such friction resistance is commonly referred to as prevailing torque. The greater the prevailing torque, it can be appreciated, the lesser the tendency for the bolt to loosen from the nut in vibrational and load stresses. Thus in the industry, a threaded fastener arrangement having a greater prevailing torque is said to have a greater locking ability. Thread-to-thread engagement of greater than 60%, however, does not necessarily increase the static strength of the threaded fastener, inasmuch as the shearing strength remains constant unless there has been some stripping or shaving of the bolt or male thread. The total surface area of the screw thread in the context used here, shall mean only the total surface area of the screw thread which at any one time comes within the boundaries of the nut's threaded area.

Frequently the outside and inside diameters of the nut threads are purposely formed to be larger than the outside and inside diameters of the screw threads, so that when the screw is inserted into the nut there will be no possibility that the screw will be forced to form or to "push steel". The term to "push steel" is commonly used within the thread fastener industry to describe the function a screw performs when it is inserted into a smaller nut hole, and is thereby obliged in the forming of the nut thread to remove steel from the nut hole, and to push it ahead of the bolt through the hole. This interference of the bolt with the nut when the nut and the bolt are of like material or when the bolt is of a harder material than the nut or female thread, results in a galling and stripping away of portions of the bolt or male thread. In such circumstances it can be appreciated, the male thread would later have a greater tendency to fail since its original thread root thickness and design has been substantially reduced. S.A.E. and most industrial specifications require the bolt or male thread tolerance to exceed twice the nut or female thread tolerance. This requirement is a result of such galling or stripping of the male thread. Moreover, such a designed greater outside and inner diameters of the male nut thread has a tendency to result in the lessening of the thread-to-thread engagement ratio.

It is desired to increase the thread-to-thread engagement ratio without requiring the screw so to push steel.

SUMMARY OF THE DISCLOSURE

An internally threaded nut or hole is described having only partially formed threads therewithin. The partially formed threads have a greater inner diameter, and a lesser outer diameter, the crest and the valleys of the nut thread being only partially formed and well-rounded. The volume of the nut remains constant between the time before and the time after the screw is inserted through the nut or hole. The method of making such a threaded nut, and the method of fastening this nut to a screw is described, wherein the thread-to-thread engagement ratio is increased to exceed 55% and more.

DESCRIPTION OF THE PREFERRED EMBODIMENT

Figure 1:
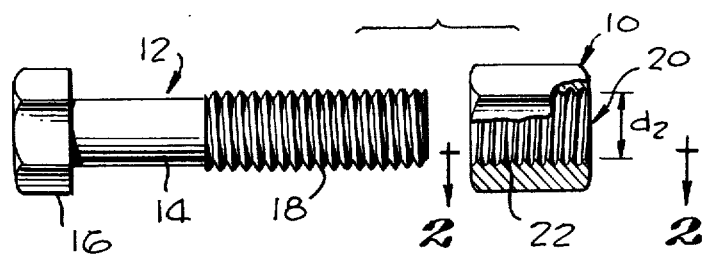
FIG. 1 illustrates a cross-sectional, side elevational view of the preferred embodiment of the invention.

In order to eliminate the before-described problem and to achieve the aforementioned objective, a nut 10 is described for receiving a screw fastener or bolt 12, reference being had initially to FIG. 1 of the drawings. Bolt 12 is a standard threaded fastener comprising a cylindrical shank 14, a head 16 and a threaded portion 18. The threaded portion 18 of bolt 12 is formed having substantially correctly formed thread or threads in helical form around the shank 14. The threads 18 have pointed crests and sharp, relatively pointed valleys between the crests.

As shown, nut 10 could be a separate fastening element, or it could be merely a hole within a sheet or plate or other working material which is to be joined by the insertion of bolt 12. It is only necessary for the practice of this invention that there be provided a hole 20 in which the construction of the preferred embodiment of the invention may be obtained. The interior diameter of the hole 20 prior to any reforming or deforming is shown in FIG. 1 as the measurement $d_2$.

Figure 2:
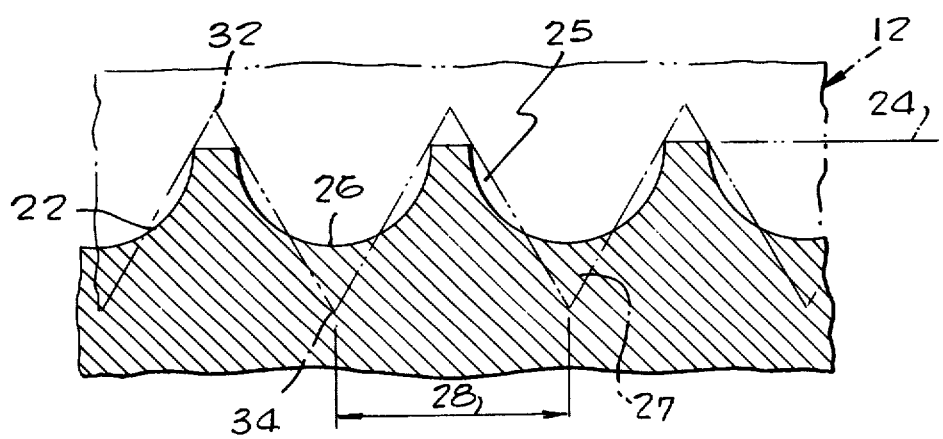
FIG. 2 illustrates an enlarged cross-sectional view of the preferred embodiment of the invention as taken along 2-2' of FIG. 1.

Threads 22 are partially formed within the hole 20. Attention is directed to FIG. 2, which is a view taken along line 2-2' in FIG. 1. Referring to FIG. 2 where the threads 22 of the nut 10 are shown in enlarged detail, it can be seen that threads 22 are formed having level tops or "crests" 24, and rounded valleys 26. As can be seen, the valleys 26 are only partially formed so that the valleys 26 are very rounded and are distinctly not pointed. Thus, a distinct nut-thread formation is developed. In this embodiment, the thread 22 height as measured from the apex of the valley floor 26 is substantially diminished, and the valley 26 appears to have a truncation or rounding which substantially diminishes the major diameter of the nut fastener thread.

The minor diameter of the nut thread 22 remains $d_2$ since in the special forming of this thread 22, the interior of the hole 20 is not touched at certain periodic portions, as will be described in greater detail below. The rounding of the valley 26 or of the major diameter of the nut, increases the clearance at the valley 26 or root of the nut thread. Such additional clearance reduces the pressure of the nut thread in the reforming which occurs when the bolt 12 is forcefully inserted into the nut 10.

Figure 3:
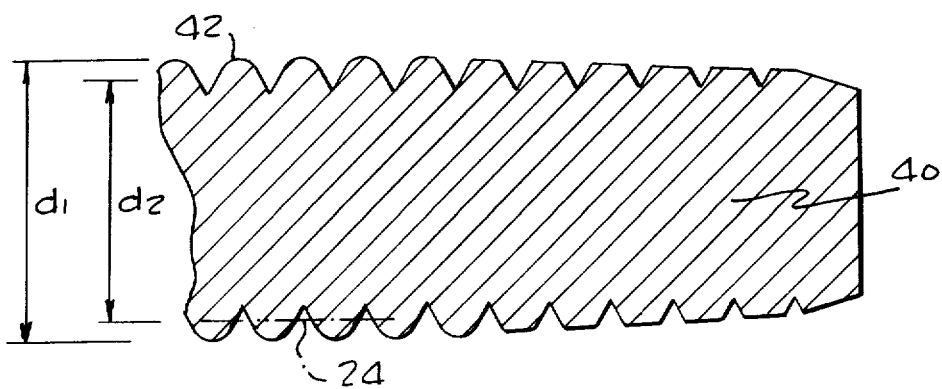
FIG. 3 illustrates a side elevational view of a portion of a preferred embodiment of the invention.

The unique nut 10 can be made by using a tapping bolt 40, reference being had to FIG. 3 of the drawings. Tapping bolt 40 is constructed having helically formed thread 42 formed thereabout. The thread 42 however, is unconventional inasmuch as the crests of the thread are rounded. The major diameter of the rounded thread 42 is given in FIG. 3 by measurement $d_1$. The tapping bolt 40 must have its major diameter $d_1$ larger than the diameter $d_2$ of hole 20 in the nut 10 prior to any formation of a thread in nut 10. It is important that the diameter $d_2$ of the hole 20 be greater than the minor diameter of the tapping bolt 40, the minor diameter being considered as the diameter across the tapping bolt shank between the sharp valleys disposed oppositely or 180° from each other.

The tapping bolt 40 is driven into the unformed hole 20 in substantially the conventional manner. The forming of the surface 24 of the hole 20, however, is unconventional. The specially constructed thread 42 forms rounded valleys 26 within the hole 20. Because the interior diameter $d_2$ of hole 20 is greater than the minor diameter of bolt 40, the valleys of the thread 42 do not come into any engagement with the material of the nut 10. Thus, the "crest" 24 resulting from this forming process leaves a flat edge, as seen in the enlarged view of FIG. 2. Once the tapping bolt has been inserted into the hole 20 so that a substantially uniform thread is formed on the entire distance of the hole 20, the tapping bolt 40 is unwound in exactly the opposite manner as it was wound into the hole, and then can be used for tapping other nuts, not shown.

The tapping bolt 40, as shown in FIG. 3, is shown having a gradual conical end, and a substantially cylindrical shank portion, as is conventional for tapping bolts. In forming the nut of the present invention, the tapping bolt 40 must be inserted sufficiently through the hole 20 so that at one moment the hole 20 contains solely substantially only the cylindrical portion of the bolt 40.

Crucial to the preferred embodiment of this invention is the fact that the volume within the helical thread protrusion, as seen in cross section in FIG. 2, from one peak or apex of the valley 26 of one turn to a peak or apex of another turn, as represented in FIG. 2 by the distance 28, should be substantially the same amount of cross-sectional area as might be found if the threads 22 were fully formed. If the threads 22 were fully formed according to conventional forming techniques, the thread 22 would have a crest 32 such as is seen in phantom, and a sharp, pointed valley 34, as also seen in phantom in FIG. 2 of the drawings.

In operation, the bolt 12 is inserted into the hole 20 of the nut 10, in the following manner. As the bolt 12 is inserted into the hole 20, the threaded portion 18 engages the partially formed threads 22 of the hole 20. As the crests of threads 18 engage the rounded valleys 26, the outside diameter is extended from the valley 26 to the valley 34, shown in phantom. The entire helical turn of the thread 22 is reformed, forcing the material which is evacuated to accommodate the crest of thread 18, to surfacially move into the trough-like spaces 25 along the sides of the thread 22. The volume amount of material removed from the valley 26 to form the valley 34, is substantially the same volume forced into the rounded trough-like spaces 25 to form the relatively straight sides of thread 22 shown in phantom in FIG. 2. Thus it can be appreciated, the pushing of steel ahead of the bolt 12 is very substantially held to a minimum.

In practice, it has been found that thread-to-thread engagements exceeding 60% can be achieved by the aformentioned partially formed threaded nut and fastening method. It is believed that the thread forming which is accomplished by the insertion of the threaded portion of bolt 12 into the hole 20, while seemingly minor in that it only reforms very small portions of the thread and thus does not meet with the resistance commonly found by conventional thread forming bolts, nevertheless reforms the thread surfacial area which is the area within the hole 20 of the nut 10 which area, in fact, ultimately comes into contact with the surface of threads 18. Thus, only the thread surface engagement portions of the surface of the helical thread turns in the nut 10 are reformed, but the essential helical thread 22 itself is not reformed.

It is to be noted that the reforming of the basic cross-sectional area of the helical thread 22 is principally or primarily only a reforming of the valley 26, and to a lesser or minor degree of the thread "crest" 24. Only portions of the surface of the thread 22 are formed to be in more perfect and more full contact with the threads 18. It is in such a manner that the thread-to-thread engagement ratio can exceed 60%, it is believed. It is believed that the space between the thread "crest" 24 of thread 22, and the thread valley 32 of thread 18 provides a trough-like space within the fastening arrangement which allows for material flow along the surfaces of the thread 22, when such metal or material flow is too excessive to be taken up by the trough-like spaces 25 along the rounded sides of thread 22. In this description, it will be helpful to view the phantom line of FIG. 2 as illustrating the outline of thread 18 after fastening it into the unique hole 20.

It can be appreciated, that the material of bolt 12 must be such that it can reform the material of nut 10. Of course, such result is achieved when the material of bolt 12 is harder than the material of bolt 10. However, the material of bolt 12 may be more ductile and softer relatively than the material of nut 10, provided that the crests of the threads 18 are hardened sufficiently to reorient or reform the threads 22 of nut 10. Such a construction of the threads 18 can be made according to electrode arc deposition impregnation. In such a manner, substantially harder material relative to the material comprising nut 10 is deposited or impregnated into the crests of the thread 18, without affecting the remainder of the bolt 12 material. Such relatively harder material could be tungsten carbide or the like. Such a process and the resulting product is now described fully in my co-pending application Ser. No. 353,449, filed Apr. 23, 1973, now U.S. Pat. No. 3,894,570. The description as made in this co-pending application is incorporated herein for reference.

While I have described the "crest" 24 of the nut 10 as being substantially flat as seen in cross-sectional view of FIG. 2, it has been found that this "crest" can become somewhat rounded from the forming process as described above. Thus, when the forming bolt 40 is driven into the hole 20, the material reformed and removed from the thread 22 valley 26 is pushed or relocated. Some of this material it is believed, deposits on the surface 24 as seen in the cross-sectional view of FIG. 2, and gives the "crest" 24 a somewhat rounded or irregular shape. It is important, however, that the "crest" 24 not have the conventional sharp or pointed shape, but have a substantially flat or perhaps rounded cross-sectional shape as shown substantially in the cross-sectional view of FIG. 2. It is important that the bolt minor diameter not be substantially reduced, or reformed so as to weaken the basic thread structure on the bolt.

In summary, it can be seen and appreciated once the fastening has been made according to the process and the nut as taught herein, a reformable nut thread is achieved having increased thread engagement capability with the bolt, which engagement exceeds normal commercial thread standards. Moreover, a more intimte contact between the surface areas of the nut and the bolt threads results from the reorientation of the nut thread surface. This reorientation results in an increased friction contact between the thread surface areas of the nut and bolt respectively, producing substantially increased locking ability or prevailing torque and substantially reducing the tendency to loosen under vibrational or load stresses.

While I have described the preferred embodiment of my invention in the foregoing description, it can be appreciated that variations of my preferred embodiment can be made without departure from the spirit of my invention. Moreover, it can readily be appreciated that the unique structure and process of forming the same can be practiced to form pipe couplings, machine connections and the like, by specially forming the interiorly threaded coupling member by the teachings of this invention. Thus, the scope of my invention and of my patent should be limited only by the claims appended.

I claim:

1. A method of forming a threaded female fastener, comrising the steps of:
   a. forming a partial internal helical thread in the female fastener, where said internal helical thread includes
      1. a complete internal helical thread crest
      2. an incomplete internal thread root with a rounded root contour between adjacent turns of said female fastener thread, and
      3. a first width between opposite internal thread flanks greater than that required for a complete internal helical thread, and
      4. a second width between opposite internal thread flanks less than that required for a complete internal helical thread, and
   b. reforming said partial helical threads into a complete internal helical thread by threading a threaded male fastener having a complete external helical thread, having a diameter greater than the outside diameter of said rounded root contour, into the female fastener including the steps of:
      1. pushing fastener material from said rounded root contour thereby developing a complete internal thread root with a sharp, pointed valley,
      2. receiving said fastener material from said rounded root contour at said opposite internal thread flanks having said second width, and
      3. forming said received fastener material into a final width between said opposite internal thread flanks where said final width is that required for the complete internal helical thread.

2. The method of claim 1 in which said threaded male fastener comprises material substantially harder than the material comprising the female fastener.

3. The method of claim 1 in which threading said male fastener into said partial internal helical thread includes the step of forming thread-to-thread engagement between said complete external helical thread and said complete internal helical thread greater than 60%.

* * * * *